(12) United States Patent
Edmister

(10) Patent No.: US 8,523,464 B2
(45) Date of Patent: Sep. 3, 2013

(54) CONTOURED KEYBOARD WITH JOYSTICK MOUSE DEVICE

(76) Inventor: Wm. David Edmister, Mill Valley, CA (US)

(*) Notice: Subject to any disclaimer, the term of this patent is extended or adjusted under 35 U.S.C. 154(b) by 750 days.

(21) Appl. No.: 12/816,189

(22) Filed: Jun. 15, 2010

(65) Prior Publication Data

US 2011/0175811 A1 Jul. 21, 2011

Related U.S. Application Data

(60) Provisional application No. 61/297,240, filed on Jan. 21, 2010.

(51) Int. Cl.
*G06F 3/02* (2006.01)

(52) U.S. Cl.
USPC .......................................... 400/489; 400/472

(58) Field of Classification Search
CPC .............................. G06F 3/0213; G06F 3/0216
USPC .................................. 400/472, 486, 488, 489
See application file for complete search history.

(56) References Cited

U.S. PATENT DOCUMENTS

| | | | | |
|---|---|---|---|---|
| 6,542,091 | B1* | 4/2003 | Rasanen | 341/22 |
| 6,860,661 | B1* | 3/2005 | Daoud | 400/488 |
| 2002/0000975 | A1* | 1/2002 | Perkins et al. | 345/168 |
| 2005/0156894 | A1* | 7/2005 | Chen et al. | 345/168 |
| 2009/0256802 | A1 | 10/2009 | Lou et al. | |

* cited by examiner

*Primary Examiner* — Daniel J Colilla
(74) *Attorney, Agent, or Firm* — Dergosits & Noah LLP; Todd A. Noah

(57) ABSTRACT

This disclosure describes an ergonomic computer keyboard with an integrated joystick pointing device. The keyboard incorporates a palm support and a key orientation that enables a user to rest his hand on the palm support and access keys. The joystick pointing device is situated on a portion of the keyboard that is closest to the user such that the user can manipulate the joystick pointing device without removing his hands from the keyboard.

14 Claims, 4 Drawing Sheets

CONTOURED KEYBOARD WITH JOYSTICK MOUSE DEVICE

CROSS-REFERENCE TO RELATED APPLICATIONS

This application is a nonprovisional patent application of U.S. Provisional Patent App. No. 61/297,240, entitled "CONTOURED KEYBOARD WITH JOYSTICK MOUSE DEVICE," filed on Jan. 21, 2010, and incorporated in full herein.

FIELD

This disclosure relates generally to computer interface devices, and specifically, to an ergonomic computer keyboard with an integrated pointing device.

BACKGROUND

A keyboard and mouse remain the most commonly-used peripheral devices for interfacing with a computer. Traditionally, a keyboard and mouse are separate and distinct devices. As a result, a user typing with two hands must remove one hand to control the mouse, then must return that hand to the keyboard, requiring re-orientation before continuing to type. This is inefficient in terms of time as well as energy expenditure.

The traditional keyboard shape is generally a planar or slightly sloped configuration. It is well known that positioning hands to type on a traditional keyboard is not ergonomically sound, leading to carpal tunnel syndrome and other repetitive motion injuries.

It would be beneficial to provide a particular keyboard orientation that not only better suits the curvature of a user's hands, but also obviates the need to remove a hand from the keyboard in order to operate an associated mouse device.

DETAILED DESCRIPTION

Disclosed herein is a contoured keyboard apparatus with an integrated joystick pointing device. The keyboard is contoured to complement the anatomical curvature of a user's hands. The joystick device is situated on the keyboard so as to facilitate manipulation of a displayed cursor or mouse pointer. Details about particular embodiments are described further below with reference to the Figures.

Figure 1:
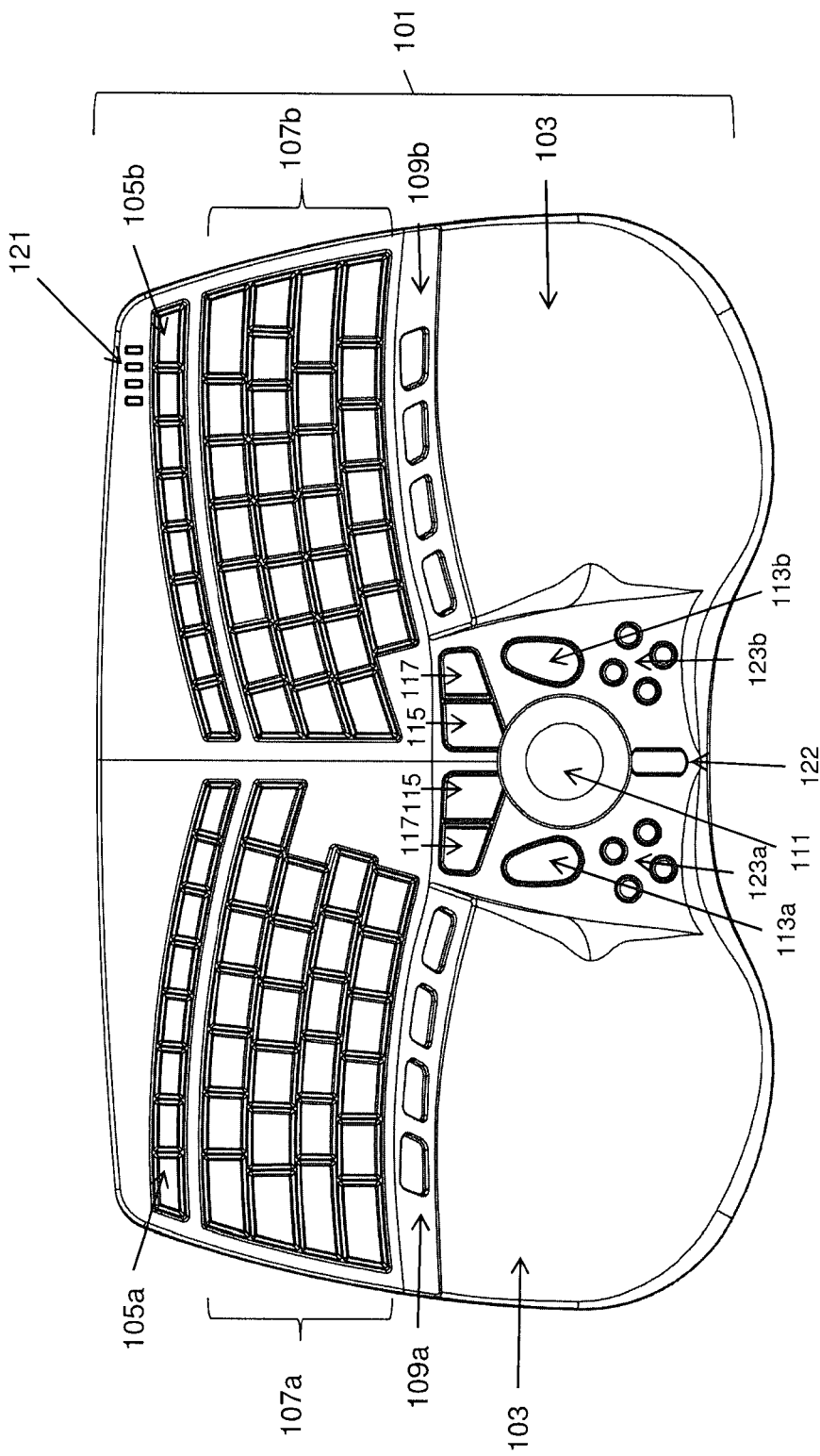
FIG. 1 is a top-down view of an embodiment.

FIG. 1 is a top-down view of an embodiment of this disclosure. As referred to herein and shown in the Figures, keyboard 101 has a top surface and a bottom surface, a "left edge" that corresponds to a user's left hand side, and a "right edge" the corresponds to the user's right hand side. Keyboard 101 has a portion that is closest to the user that is referred to herein as a "front edge," and a portion that is farthest from the user that is referred to herein as a "back edge."

As shown in the figures, and specifically, in FIG. 1, keyboard 101 is convex in shape, with a raised palm support 103 parallel to the front and back edges of keyboard 101, and traversing the approximate mid-line of the keyboard 101. The alphanumeric keys are divided into two portions, a left portion 107a and a right portion 107b corresponding to the left and right edges of keyboard 101. Joystick 111 lies in the middle of keyboard 101 toward the front edge of keyboard 101. During operation of keyboard 101, a user can rest respective palms on palm support 103 such that the fingers curve naturally downward over left portion 107a and right portion 107b. In this position, the user's thumbs may be used to manipulate joystick 111. In this fashion, a user may control alphanumeric key input and cursor manipulation without having to remove a hand to operate a separate mouse or other pointing device. In addition, because of the shape of keyboard 101 and the raised palm support 103, the placement of the fingers on the keyboard reduces wrist strain.

In an embodiment, keyboard 101 and palm support 103 may be comprised of different materials. For example, keyboard 101 may be comprised of a hard plastic composite, polycarbonate, aluminum, or other known materials. In one embodiment, the bottom surface of keyboard 101 includes a non-stick pad. Palm support 103 may be comprised of a softer material, such as foam or gel. In an embodiment, keyboard 101 and palm support 103 may be comprised of the same material. One having skill in the art will appreciate that this disclosure does not limit keyboard 101 and palm support 103 to any one material, and that the materials described herein are merely exemplary.

As mentioned above, palm support 103 is a raised portion on the top surface of keyboard 101. In an embodiment, the palm support 103 is contoured to complement the shape of a human palm, thereby providing a base for supporting the user's palms when operating keyboard 101. As previously mentioned, this enables a user to position his hands such that fingers may be extended to type on the keys 107a and 107b, while also operating joystick 111 using one or both thumbs. In an embodiment, alphanumeric keys 107a and 107b are also oriented to complement the reach of a user's fingers. As shown in FIG. 1, keys 107a and 107b are arranged in an arc-like formation corresponding to the various lengths of a user's fingers. Function keys 105a and 105b are also placed in an arc-like formation toward the back edge of keyboard 101. Function keys 105a and 105b may be configured to perform any function, similar to the F1-F12 keys found on a conventional computer keyboard. One having skill in the art will appreciate that function keys 105a and 105b are not limited to F1-F12 keys, and that other keys may be located in the portion of keyboard 101 designated for function keys 105a and 105b.

In an embodiment, ledge keys 109a and 109b are located on the side of the palm support 103 that is farthest from the user and toward the back edge of keyboard 101. Ledge keys 109a and 109b are oriented at an angle that is up to 90 degrees from the top surface of keyboard 101. A user can access ledge keys 109a and 109b by curling his fingers toward his respective palms while the palms rest on or hover above palm support 103. Ledge keys 109a and 109b can be assigned any non-alphanumeric function, or may be configured to perform "Ctrl," "Fn" or function key, "Alt," arrow, number lock, caps lock, insert, home, end, page up, page down, delete or other functions. In the figures only eight total ledge keys are shown. However, one of ordinary skill in the art will appreciate that more or less keys may form part of keyboard 101, and that the number and placement of keys as shown in the figures are not meant to be limiting in any way.

In an embodiment, the spacebar on keyboard 101 may be comprised of more than one key, as is shown in FIG. 1. This provides multiple options for a user, as the user's thumbs can access any of the spacebar keys 113a and 113b. As FIG. 1 shows, spacebar keys 113a and 113b are located near the portion of keyboard 101 that is situated closes to the user, surrounding joystick 111.

In an embodiment, mouse buttons 115 and 117 are located toward the middle of keyboard 101. Mouse buttons 115 may correspond to the "left-click" button on a conventional mouse device, and mouse buttons 117 may correspond to the "right-click" button on a conventional mouse device. However, one having ordinary skill in the art will appreciate that the functions for mouse buttons 115 and 117 may be configurable by the user. For example, "left-click" and "right-click" functions can be reversed. In an embodiment, functions can be assigned to mouse buttons 115 and 117, such as application switching or launching functions, media player functions, and the like.

In an embodiment, joystick 111 is situated on the top surface of keyboard 101 on the front edge of keyboard 101. Joystick 111 is a multi-directional pointing device for directing a cursor on a display. The top portion of joystick 111 may be comprised of a combination of hard or soft material to provide comfort to the user's thumbs. For example, the top portion of joystick 111 may be a hard plastic material surrounded by a softer rubber or foam material. In an embodiment, joystick 111 may also be depressed in order to provide added functions. For example, depressing joystick 111 may cause an item to be selected on a display, similar to the "left-click" function on a conventional mouse device. Other functions may be configured by the user. In an embodiment, joystick 111 is only a pointing device. In an embodiment, rather than a joystick, a trackball or other pointing device may be incorporated into keyboard 101, so long as it allows the user to control a cursor on a computer screen without requiring that the user remove his hand from the keyboard.

In an embodiment, keyboard 101 may feature a scroll wheel 122 in a portion near the front edge of keyboard 101, as shown in FIG. 1. Manipulation of scroll wheel 122 may correspond to up and down movements on a display screen, zoom in and zoom out movements, up and down sound volume, or other functions that may be configured by a user or software application. In an embodiment, scroll wheel 122 may also be depressed for additional functionality.

In an embodiment, keyboard 101 may feature additional programmable keys 123a and 123b, shown on a portion closest to the front edge of keyboard 101 in FIG. 1. Keys 123a and 123b may operate as directional arrow keys, or may be programmed to perform other functions. One of ordinary skill in the art will appreciate that the availability of additional keys such as keys 123a and 123b may extend the functionality of keyboard 101.

In an embodiment, keyboard 101 may be used as a game controller. For example, joystick 111 may be used to control a character or other aspects of game play, and ledge keys 109a and 109b may be assigned functions to enhance or interact with a computer game. One skilled in the art will appreciate that keyboard 101 may be used in a variety of ways in order to provide input to a computer.

In an embodiment, keyboard 101 may be used as a multimedia input device. For example, keyboard 101 may accept headphone and/or microphone peripherals, thereby providing audio and verbal input and output for a user. In addition, the keyboard 101 may include one or more haptic sensors to provide tactile feedback input to the user. In another example, keyboard 101 may be programmed to operate music, video or presentations, and the keys may be programmed to complement application programs for playing or creating audio, video or presentation content.

In an embodiment, keyboard 101 may connect to a computer using a wired connection, such as a wire and USB connection. In an embodiment, keyboard 101 may be wireless, using Bluetooth, radio, infrared or other wireless protocols for communication with a computer.

In an embodiment, keyboard 101 may display one or more indicator lights 121. In FIG. 1, indicator lights 121 are positioned toward the back edge of keyboard 101, closest to the right side. However, one of ordinary skill in the art will appreciate that indicator lights may be placed in other portions of keyboard 101. Indicator lights may show whether the CAPS lock key, scroll lock key, and/or number lock key is activated. Other indicator lights may display available battery power remaining in keyboard 101, if keyboard 101 runs on batteries. Other indicator lights may display whether or not keyboard 101 is connected to a computer using a wired or wireless connection. Other uses for indicator lights may also be considered without departing from this disclosure.

Figure 2:
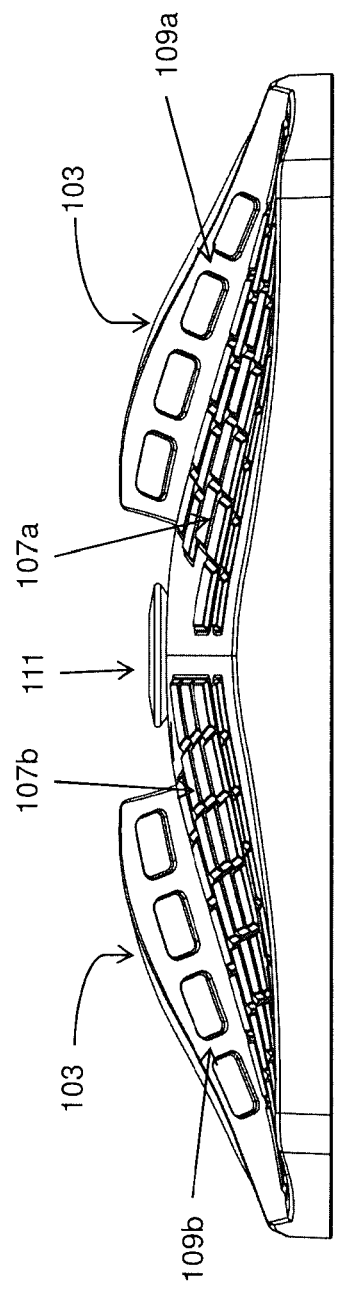
FIG. 2 is a front edge view of an embodiment.

FIG. 2 is a view looking at the back edge of an embodiment of this disclosure showing the convex shape of the top surface of keyboard 101. Ledge keys 109a and 109b are shown at an angle along the portion of palm support 103 that is farthest from the user. When the user's palms are resting on or hovering above palm support 103, the user can access ledge keys 109a and 109b by curling his fingers toward palm support 103. This key configuration enables access to key functions without having to remove either hand from palm support 103. Joystick 111 is shown situated between the left and right portions of palm support 103.

Figure 3:
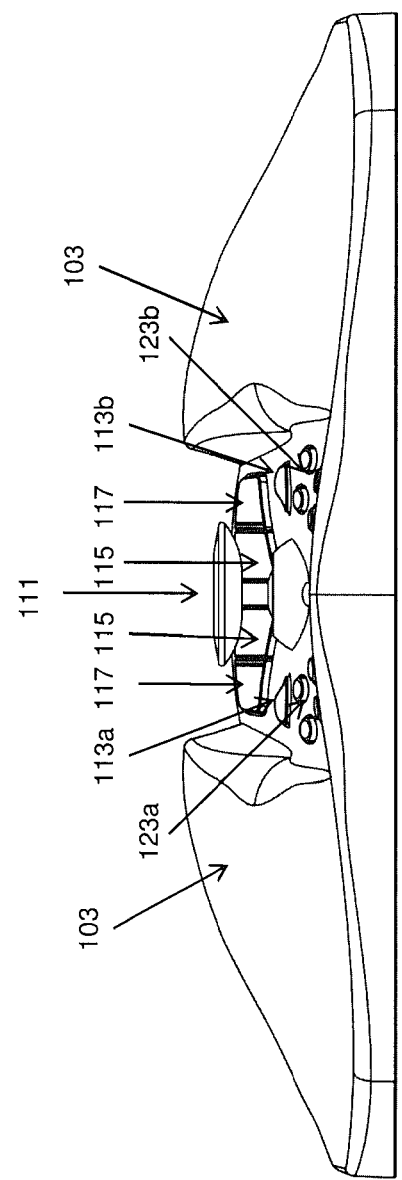
FIG. 3 is a back edge view of an embodiment.

FIG. 3 is a view looking at the front edge of an embodiment of this disclosure showing the convex shape of the top surface of keyboard 101. Joystick 111 is shown situated between the left and right portions of palm support 103. Also shown are various buttons and keys surrounding joystick 111, including "right-click" mouse buttons 117 and "left-click" mouse buttons 115, spacebar buttons 113a and 113b, and keys 123a and 123b.

Figure 4:
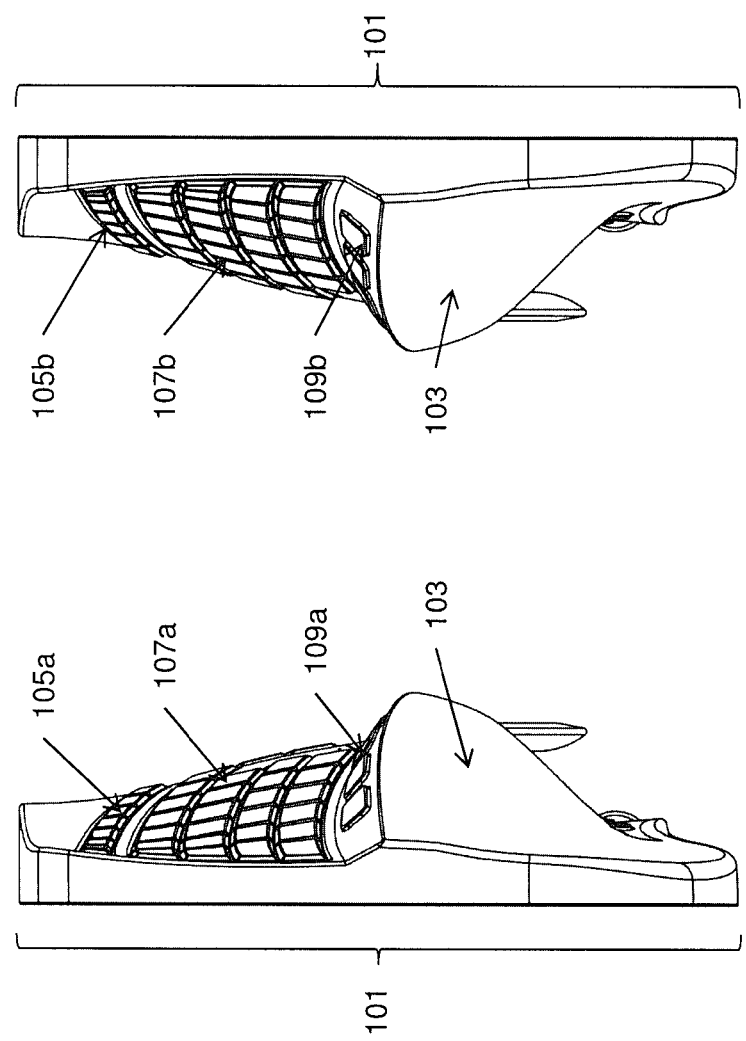
FIG. 4 is a side view of an embodiment.

FIG. 4 includes two side views of keyboard 101—a view from the left edge and a view from the right edge. Both side views show the contours of keyboard 101, including palm support 103. The arc-like curvature of keys 105a, 105b, 107a and 107b are also shown in FIG. 4. Ledge keys 109a and 109b are shown along one edge of palm support 103.

Figure 5:
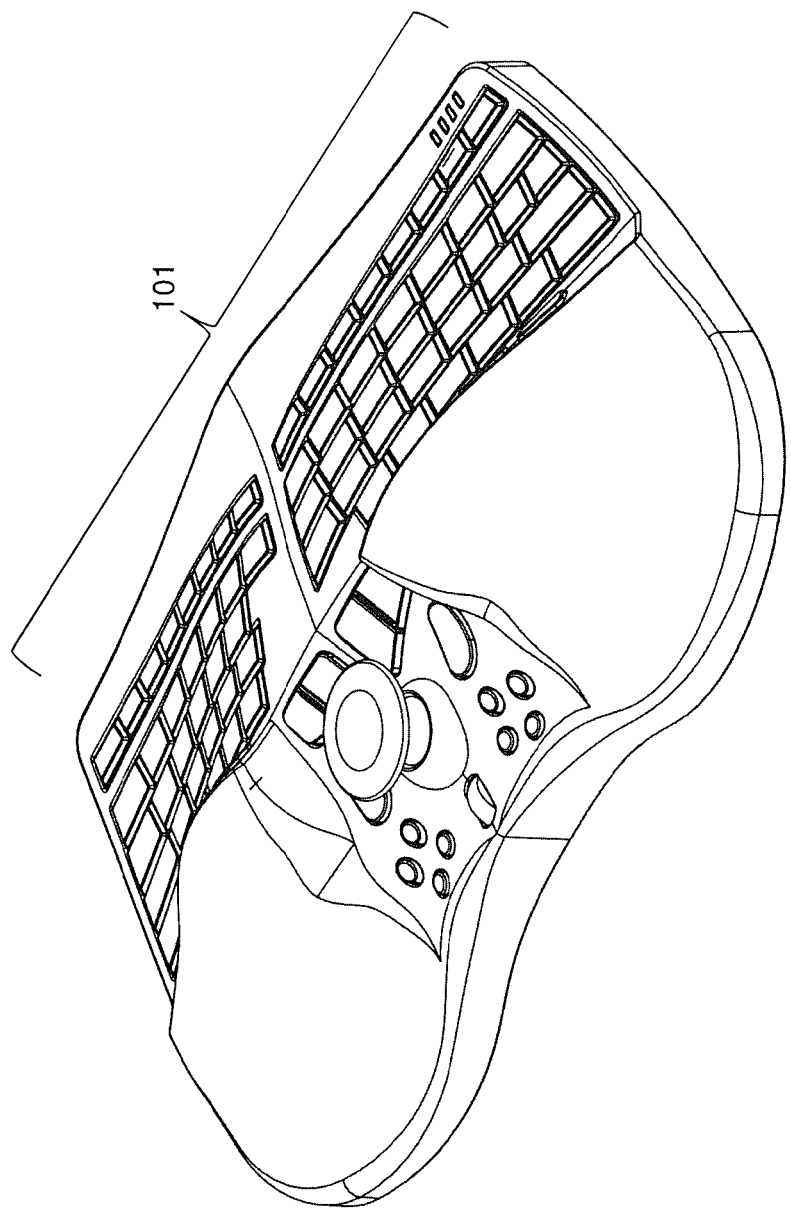
FIG. 5 is a side perspective view of an embodiment.

FIG. 5 is a top perspective view of an embodiment of this disclosure showing that the top surface of keyboard 101 are sloped downward from the mid-line of the top surface of keyboard 101 to the left and right edges of keyboard 101. This sloping orientation closely matches the natural wrist and hand positioning of a user. This orientation also accounts for different finger lengths.

In the description above and throughout, numerous specific details are set forth in order to provide a thorough understanding of an embodiment of this disclosure. It will be evident, however, to one of ordinary skill in the art, that an embodiment may be practiced without these specific details. For example, while keyboard 101 is shown including function keys 105a and 105b, as well as ledge keys 109a and 109b, one having skill in the art will appreciate that embodiments of the invention do not have all the keys shown in the Figures, and that the Figures and descriptions are merely exemplary, and are not intended to limit this disclosure in any fashion.

One having ordinary skill in the art will also appreciate that in other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. One will appreciate that these steps are merely exemplary and are not meant to be limiting in any way. Other steps and functions may be contemplated without departing from this disclosure or the scope of an embodiment.

What is claimed is:

1. A keyboard comprising:
   a top surface, a bottom surface, a left edge, a right edge, a front edge situated closest to a user, and a back edge situated farthest from the user, wherein the top surface includes a left portion and a right portion, the left portion convexly contoured such that there is a raised ledge substantially parallel to the back edge, substantially equidistant between the front edge and the back edge, and angled highest toward the center of the top surface and sloping downward toward the left edge, and the right portion convexly contoured such that there is a raised ledge substantially parallel to the back edge, substantially equidistant between the front edge and the back edge, and angled highest toward the center of the top surface and sloping downward toward the right edge;
   a plurality of rows of keys on the top surface, the plurality of rows of keys including a row of function keys, at least four rows of alphanumeric keys, and a row of non-alphanumeric keys, the plurality of keys, wherein each of the plurality of rows of keys are substantially parallel, and wherein some of the plurality of rows of keys are situated on the left portion of the top surface, and some of the plurality of rows of keys are situated on the right portion of the top surface, and wherein the plurality of rows of keys follow the contours of the top surface;
   a joystick on the top surface near the front edge, equidistant between the left edge and the right edge; and,
   a plurality of buttons located around the joystick, the plurality of buttons including a left click mouse button, a right click mouse button, a left space bar and a right space bar.

2. The keyboard of claim 1, wherein the raised ledge comprises a palm support, such that a user operating the keyboard rests a left palm of a left hand on the left portion of the raised ledge, the fingers of the left hand touchably extending to the plurality of rows of keys on the left portion of the top surface, a left thumb of the left hand touchably extending to the joystick, and such that the user operating the keyboard rests a right palm of a right hand on the right portion of the raised ledge, the fingers of the right hand touchably extending to the plurality of rows of keys on the right portion of the top surface, a right thumb of the right hand touchably extending to the joystick.

3. The keyboard of claim 1, wherein each of the function keys are smaller than the alphabet keys.

4. The keyboard of claim 1, further comprising:
   an apex of the raised ledge of the left portion forms an angle, and a portion of the row of non-alphanumeric keys is situated near the apex of the raised ledge of the left portion on the top surface toward the back edge; and,
   an apex of the raised ledge of the right portion forms an angle of 90 degrees, and a portion of the row of non-alphanumeric keys is situated near the apex of the raised ledge of the right portion on the top surface toward the back edge.

5. The keyboard of claim 1, wherein the joystick controls a cursor on a display.

6. The keyboard of claim 1, wherein the joystick comprises a circular top portion on a moveable vertical base on the top surface of the keyboard.

7. The keyboard of claim 1, further comprising at least one notification light on the top surface of the keyboard.

8. The keyboard of claim 1, wherein the keyboard communicates with a computer using a wireless signal.

9. The keyboard of claim 1, further comprising one or more haptic sensors.

10. The keyboard of claim 1, wherein the bottom surface comprises a non-stick pad.

11. The keyboard of claim 1, wherein the top surface comprises a gel surface.

12. The keyboard of claim 1, wherein the top surface comprises a foam surface.

13. The keyboard of claim 1, further comprising a scroll wheel situated toward the front edge of the keyboard.

14. The keyboard of claim 1, wherein the plurality of buttons located around the joystick are programmed to perform a plurality of input functions.

* * * * *